(12) United States Patent
Matias

(10) Patent No.: US 6,269,363 B1
(45) Date of Patent: *Jul. 31, 2001

(54) METHOD OF ACCESSING DATA USING APPROXIMATE DATA STRUCTURES BY RELAXING THE OPERATIONS THAT DEFINE SAME

(76) Inventor: Yossi Matias, 11815 Rosalinda Dr., Potomac, MD (US) 20854

(*) Notice: Subject to any disclaimer, the term of this patent is extended or adjusted under 35 U.S.C. 154(b) by 0 days.

This patent is subject to a terminal disclaimer.

(21) Appl. No.: 08/710,900

(22) Filed: Sep. 24, 1996

Related U.S. Application Data

(63) Continuation of application No. 08/523,568, filed on Sep. 5, 1995, now abandoned, which is a continuation of application No. 08/187,415, filed on Jan. 24, 1994, now abandoned.

(51) Int. Cl.⁷ ..................................................... B06F 17/30
(52) U.S. Cl. .................... 707/5; 707/3; 707/100; 707/101; 707/104; 395/183.14
(58) Field of Search .................... 707/5, 3, 100, 707/104, 101; 395/183.4, 183.14

(56) References Cited

U.S. PATENT DOCUMENTS

| | | | |
|---|---|---|---|
| 4,068,298 | 1/1978 | Dechant et al. | 707/3 |
| 4,422,158 | 12/1983 | Galie | 707/5 |
| 5,014,327 | 5/1991 | Potter et al. | 382/220 |
| 5,051,947 | 9/1991 | Messenger et al. | 707/3 |
| 5,053,991 | 10/1991 | Burrows | 365/49 |
| 5,390,359 | 2/1995 | Damerau | 707/3 |
| 5,519,840 | * 5/1996 | Matias et al. | 395/375 |
| 5,739,820 | 4/1998 | Lyon | 345/426 |
| 5,923,837 | * 7/1999 | Matia | 395/183.14 |

OTHER PUBLICATIONS

Young et al., "Approximate data structure with application," (chapter 22), proc. 5th ACM Symp. on discrete algorithms, pp. 187–194, Jan. 1994.*

Foley et al., "Fundamentals of Interactive Computer Graphics", Addison–Wesley Systems Programming Series, pp. 578–583, Jul. 1984.

Kahaner et al., "Numerical Methods and Software" 1989, pp. 1–80.

M. W. Bern et al., "Fast Geometric Approximation Techniques and Geometric Embedding Problems," 5th ACM Symp. on Computational Geometry, 292–301 (1989).

Y. Matias et al., "Approximate Data Structures with Applications," (Chapter 22) Proc. 5th ACM–SIAM Symp. on Discrete Algorithms, Arlington, Va 187–194 (Jan. 1994).

M.W. Bern et al., "Fast Geometric Approximation Techniques and Geometric Embedding Problems," Theoretical Computer Science, 106: 265–281 (1992).

Y. M. Matias et al., "Dynamic Generation of Discrete Random Variates," (Chapter 39) Proc. 4th ACM–SIAM Symp. on Discrete Algorithms, Austin, TX, 361–370 (Jan. 1993).

* cited by examiner

Primary Examiner—Anton W. Fetting
Assistant Examiner—Jean M. Corrielus
(74) Attorney, Agent, or Firm—Irah H. Donner; Hale and Dorr LLP

(57) ABSTRACT

A method for constructing approximate data structures is disclosed in which the operations that define the data structure are relaxed. The operations are specified such that error of approximation in the results of the operations may be traded for speed in executing the operations.

16 Claims, 3 Drawing Sheets

METHOD OF ACCESSING DATA USING APPROXIMATE DATA STRUCTURES BY RELAXING THE OPERATIONS THAT DEFINE SAME

This application is a continuation application of, U.S. application Ser. No. 08/523,568, filed Sep. 5, 1995, now abandoned, which is a continuation application of U.S. application Ser. No. 08/187,415, filed Jan. 24, 1994, now abandoned.

TECHNICAL FIELD

The invention relates to the area of data structures.

BACKGROUND OF THE INVENTION

Data structures are important tools in the design of compilers, operating systems, algorithms and data bases. As used herein, the term data structure means a collection of data items, the relationships between the data items (e.g. the organization or arrangement of the data items) and the functions (operations) that can be applied to, or operate on, the data items. One simple example of a data structure is an integer array where the data items are integers, typically stored or arranged in an array of sequential memory locations and where the functions available include "store" (i.e. given a data item and a subscript, then associate that item with the subscript) and "retrieve" (i.e. given a subscript, provide the data item associated with the subscript).

Data structures are created and manipulated by programs executed on a computer and are stored in the computer's memory. The memory representation of a data structure is generally influenced by the hardware capabilities of the computer in which the structure will be used, and the efficiency of a particular data structure is directly influenced by the way in which the elements (items) of the structure are accessed by the memory hardware.

Although data structures may be implemented in a variety of hardware configurations, the performance of a given data structure can be quantified independent of hardware configuration, as long as a model of the computer is specified, e.g., a Random Access Machine (RAM) model. See, e.g., A. V. Aho, J. E. Hopcroft and J. D. Ullman, *The Design and Analysis of Computer Programs*, Addison-Welsey Pub. Co. Inc., Reading, Mass. (1974). Then, given a model, the performance of the given data structure can usually be quantified as a function of the number of data items in the data structure.

SUMMARY OF THE INVENTION

In accordance with the present invention, it is recognized that it may be advantageous to approximate data structures by relaxing the operations which define a data structure so that error of approximation in the results of the operations may be traded for speed in executing the operations. In particular, when an operation is relaxed as function of an error parameter then typically the speed is improved as a function of the error parameter.

The inventive notion of approximate data structures may be illustrated by an example: consider an operation which is required to find the maximum value x of an item in a data structure. A relaxed operation may be used instead to find some item y such that $(1-\epsilon)x \leq y \leq (1+\epsilon)x$ given that the parameter $\epsilon$ has been specified beforehand. The execution time will then depend on the value of $\epsilon$. In extreme cases, $\epsilon$ can be very large resulting in high error and trivial execution time or alternatively, $\epsilon$ may be very small resulting in an almost exact data structure with minimal saving in execution time.

DETAILED DESCRIPTION

Figure 1:
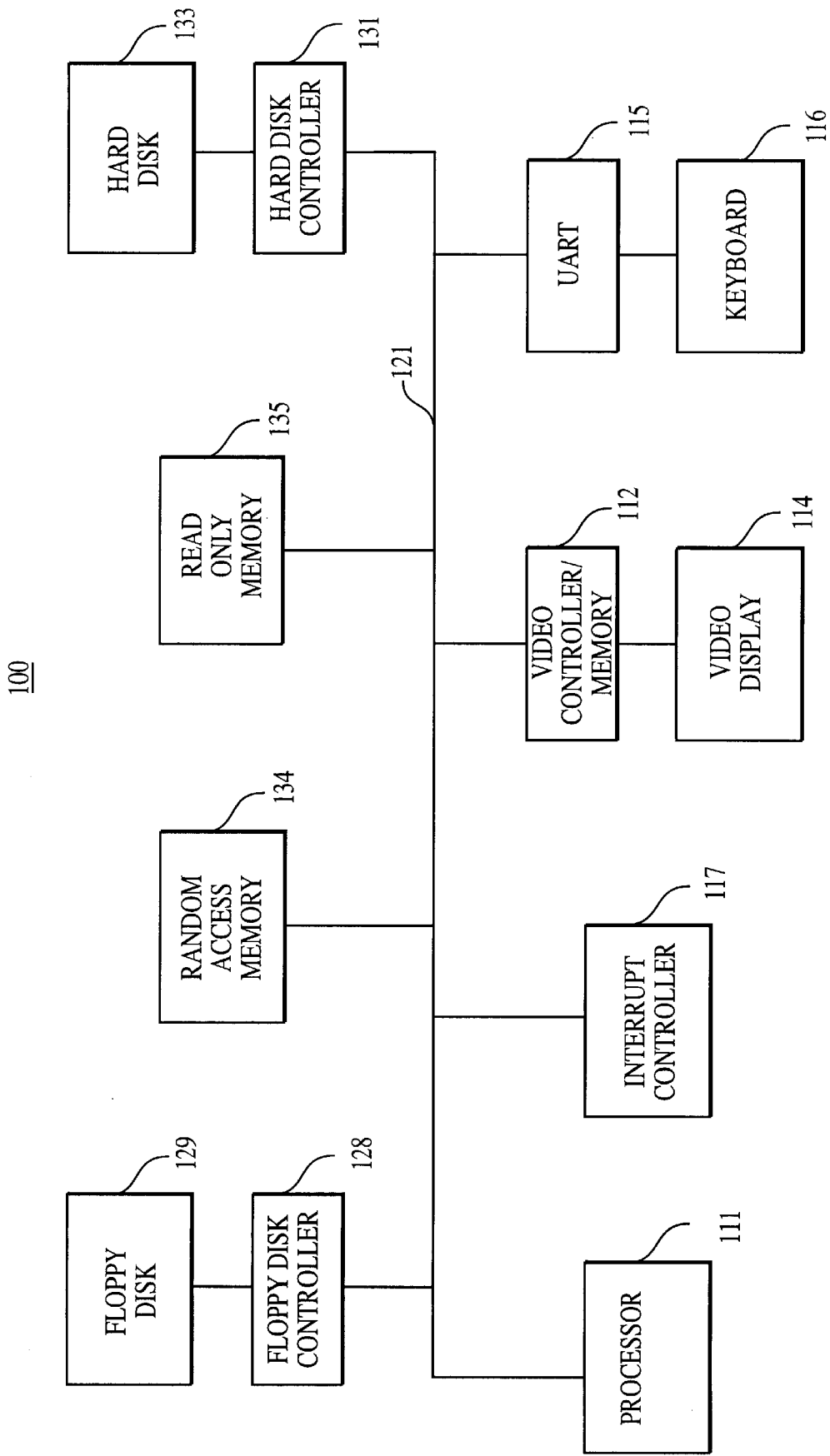
FIG. 1 shows a block diagram of a system in which the invention may be practiced.

FIG. 1 shows a block diagram of system 100, illustratively based on the architecture of personal computers, in which the invention may be practiced. System 100 comprises processor 111 having address, data and control busses denoted collectively as bus 121. Connected to bus 121 is video controller/memory 112 which generates signals for video display 114. Universal asynchronous receiver transmitter (UART) 115 serves as a serial interface between processor 111 and keyboard 116. Interrupt controller 117 is also connected to bus 121 and to hardware interrupt leads (not shown) which extend, inter alia, from UART 115. Floppy disk controller 128 and hard disk controller 131 serve as interfaces with processor 111 for floppy disk memory 129 and hard disk memory 133, respectively. Also connected to bus 121 are random access memory 134 and read only memory 135.

Figure 2:
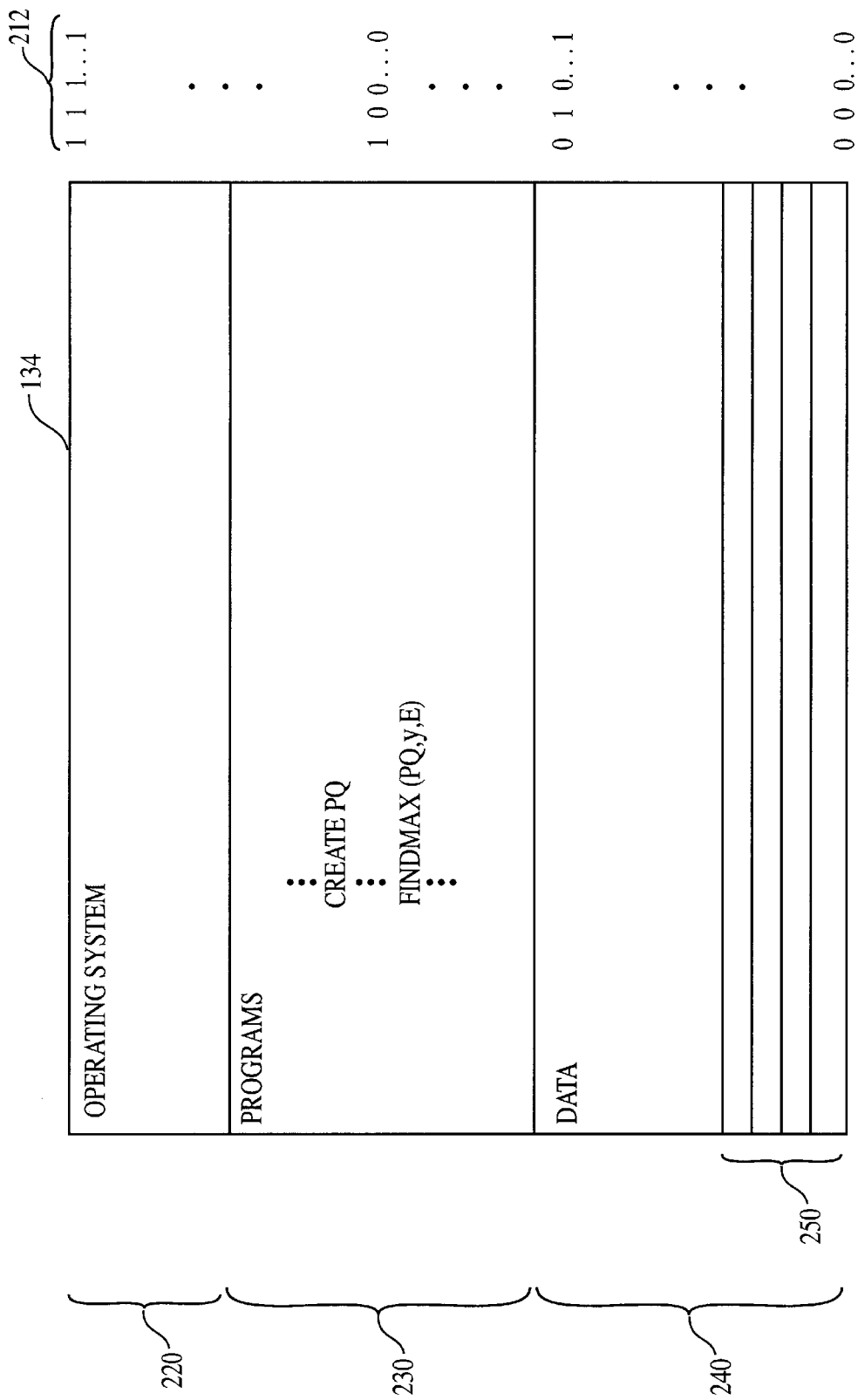
FIG. 2 illustrates the contents of a random access memory used in the system of FIG. 1.

FIG. 2 illustrates the contents of random access memory 134 in greater detail. The contents are accessed through binary addresses 212. For illustrative purposes, random access memory 134 is divided into sections. The contents of section 220 comprise an executed version of the operating system for system 100. Section 230 contains code for various programs. In section 230 several lines of code are indicated, i.e., CREATE PQ and FINDMAX (PQ,y,$\epsilon$). The code CREATE PQ is an instruction to create a priority queue data structure called PQ. A priority queue is a data structure in which each item has an associated priority number and the operations on the data structure are on a highest-priority-out-first-basis. Section 240 comprises memory locations for storing data. In particular, locations in section 250 have been allocated to store the items in data structure PQ. Illustratively the items, along with representations of the relationships between items (e.g. pointers), in PQ have been stored sequentially; however, other arrangements (e.g., link lists) may be used. The code FINDMAX (PQ,y,$\epsilon$), executes an operation on the data structure PQ to determine the maximum value y in the priority queue within a tolerance based on an error parameter $\epsilon$, i.e., the operation finds an approximate maximum value. The execution of operation FINDMAX is described in more detail below for a particular type of priority queue (also called a heap).

Denote the value of an element in the priority queue as its weight. The input elements are partitioned by weight into ranges $R_j$, such that $R_j$ is associated with the range $[(1+\epsilon)^{j-1}, (1+\epsilon)^j]$. Note that all elements in a range are within a factor of $\epsilon$ from each other. The elements of each range are kept in a suitable data structure (e.g., a link list, an array, etc.). To find the $\epsilon$-maximum, it suffices to find the maximal non-empty range and to select an element in this range.

Consider the case where the maximum value x in the data structure PQ must be found with tolerance $\epsilon=1$ using an operation such as FINDMAX (PQ,y,$\epsilon$). The first step is to shrink the universe of values in the data structure and to guarantee that the operations on the items in the shrunk universe are consistent with the behavior of operations in the "unshrunk" universe within some parameter $\epsilon$. Suppose the items in the data structure comprise n words $x_i$, i=1,2, ... n, where each word is b bits in length. To execute the operation using the relaxed operation, a mapping $f$ is used to shrink the value (and the number of bits) of each item and to preserve the ordering of items differing by a factor of (1+$\epsilon$) or more, e.g., if a>(1+$\epsilon$)c, then a is mapped to a value greater than the value to which c is mapped. The mapping $f$ may be illustratively defined as $f:x_i \rightarrow x_i'=MSB(x_i)$, i.e., the mapping takes each binary word representation of an item and finds its most significant bit (MSB).

Figure 3:
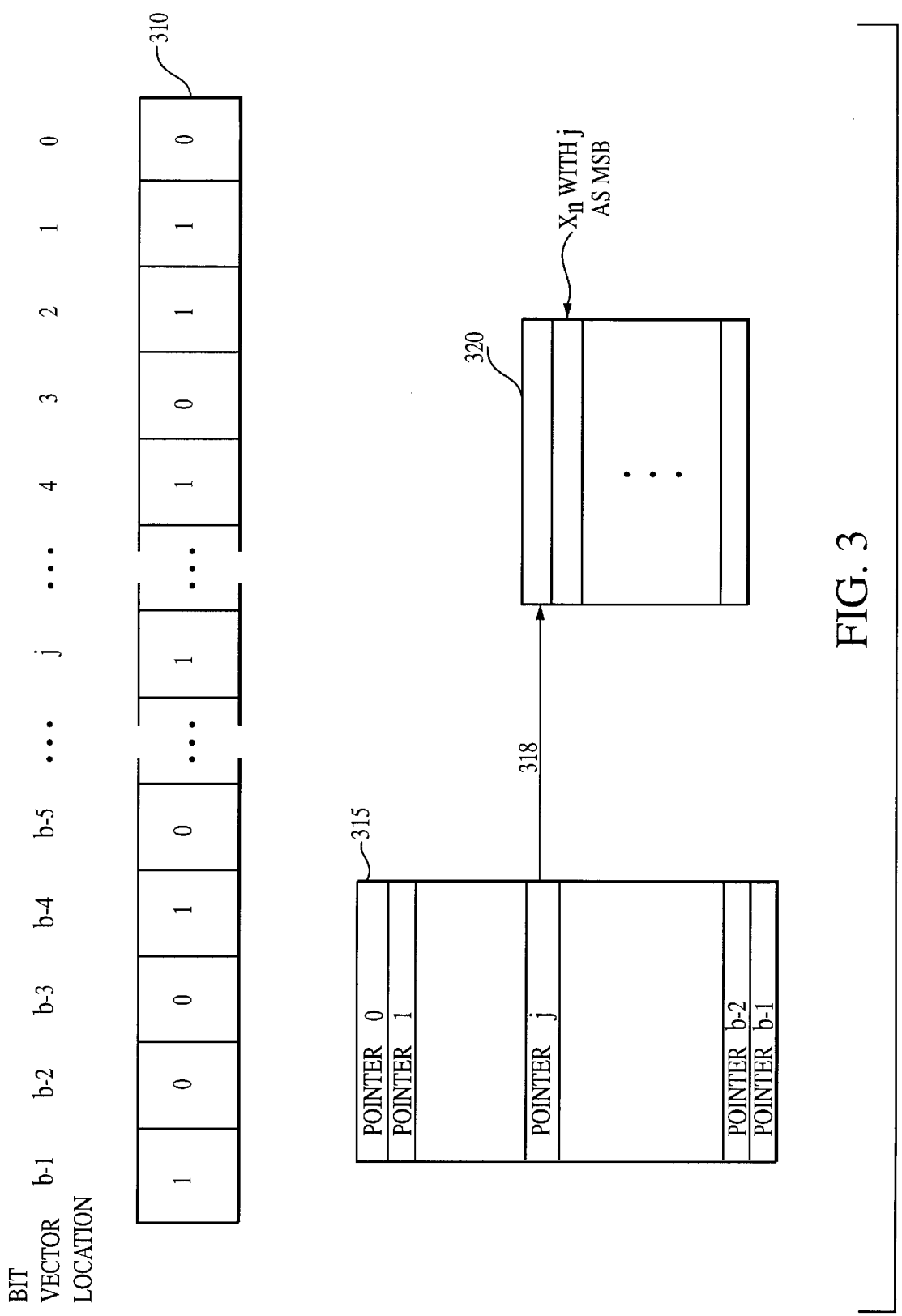
FIG. 3 shows structures used in implementing an approximate data structure.

The next step is to operate on the shrunk universe. FIG. 3 illustrates structure which may advantageously be used in this step. Memory, such as in random access memory 134 of FIG. 1, is allocated for bit vector 310. Bit vector 310 is of length b. Each of the $x_i$'s that have the same MSB, j, are grouped together into the respective $j^{th}$ bucket 320. Then for each j,j=0,1,2, . . . b−1, if the bucket is empty, a zero is placed in the $j^{th}$ position in bit vector 310. If the bucket is not empty, the $j^{th}$ position in the bit vector is set to a one and the $j^{th}$ pointer is set to the location of the $j^{th}$ bucket. Illustratively, the pointers are contained in pointer array 315. Then when operation FINDMAX (PQ,y,$\epsilon$=1) is executed, it is necessary only to compute the MSB of bit vector 310 and then select (e.g., arbitrarily) an item y from the bucket associated with the most significant bit in bit vector 310. Thus, the approximate data structure described above will, for $\epsilon$=1, find the maximum value of an item in the data structure within (1+$\epsilon$). Thus, assuming that the size of the bit vector is approximately the size of a machine word, then the FINDMAX operation may be implemented in a small number of basic RAM operations (e.g., by performing a MSB operation on the bit vector).

For those skilled in the art, a more rigorous presentation of the inventive method of approximate data structures is given below.

Approximate data structures trade error of approximation for faster operation, leading to theoretical and practical speedups for a wide variety of algorithms. Approximate variants of the van Emde Boas data structure are given which support the same dynamic operations as the standard van Emde Boas data structure, except that answers to queries are approximate. The variants support all operations in constant time provided the error of approximation is 1/polylog(n), and in O(log log n) time provided the error is 1/polynomial(n), for n elements in the data structure.

The tolerance of prototypical algorithms to approximate data structures are considered and Prim's minimum spanning tree algorithm, Dijkstra's single-source shortest paths algorithm, and an on-line variant of Graham's convex hull algorithm are also considered. To obtain output which approximates the desired output with the error of approximation tending to zero, Prim's algorithm requires only linear time, Dijkstra's algorithm requires O(m log log n) time, and the on-line variant of Graham's algorithm requires constant amortized time per operation.

The van Emde Boas data structure (VEB) (see P. van Emde et al., "Design and Implementation of an Efficient Priority Queue," *Math. Systems Theory*, 10:99–127, 1977) represents an ordered multiset of integers. The data structure supports query operations for the current minimum and maximum element, the predecessor and successor of a given element, and the element closest to a given number, as well as the operations of insertion and deletion. Each operation requires O(log log U) time, where the elements are taken from a universe {0, . . . , U}.

Variants of the VEB data structure that are faster than the original VEB are given, but only approximately correct answers are guaranteed. The notion of approximation is the following: the operations are guaranteed to be consistent with the behavior of the corresponding exact data structure that operates on the elements after they are mapped by a fixed functions $f$. For the multiplicatively approximate variant, the function $f$ preserves the order of any two elements differing by at least a factor of some 1+$\epsilon$. For the additively approximate variant, the function $f$ preserves the order of any two elements differing additively by at least some $\Delta$.

Let the elements be taken from a universe [1,U]. On an arithmetic RAM with b-bit words, the times required per operation in our approximate data structures are as follows:

| | multiplicative approx. (1 + $\epsilon$) | additive approx. $\Delta$ |
|---|---|---|
| time | $O\left(\log \log_b \dfrac{\log U}{\epsilon}\right)$ | $O\left(\log \log_b \dfrac{U}{\Delta}\right)$ |

Under the standard assumption that b=$\Omega$(log U+log n), where n is the measure of input size, the time required is the time required is as follows:

| $\epsilon$, $\Delta$/U | 1/polylog(nU) | 1/esp(polylog(n)) |
|---|---|---|
| time | O(1) | O(log log n) |

The space requirements of the approximate data structures are O(log(U)/$\epsilon$) and O(U/$\Delta$), respectively. The space can be reduced to close to linear in the number of elements by using dynamic hashing. Specifically, the space needed is O(|S|+|$f$(S)|·t), where S is the set of elements, $f$ is the fixed function mapping the elements of S (hence, |$f$(S)| is the number of distinct elements under the mapping), and t is the time required per operation. The overhead incurred by using dynamic hashing is constant per memory access with high probability. Thus, if the data structures are implemented to use nearly linear space, the times given per operation hold only with high probability.

The approach is simple to explain and is illustrated for the multiplicative variant with $\epsilon$=1 and b=1+$\lfloor$log U$\rfloor$. Let $f(i)$=$\lfloor \log_2 i \rfloor$ (the indexed of i's most significant bit). The mapping preserves the order of any two elements differing by more than a factor of two and effectively reduces the universe size to U'=1+$\lfloor$log U$\rfloor$. On an arithmetic RAM with b-size words, a bit-vector for the mapped elements fits in a single word, so that successor and predecessor queries can be computed with a few bitwise and arithmetic operations. The only additional structures are a linked list of the elements and a hash table mapping bit indices to list elements, and a dictionary mapping bit indices to list elements.

In general, each of the approximate problems with universe size U reduces to the exact problem with a smaller universe size U': For the case of multiplicative approximation we have size $$U'=2\log_2(U)/\epsilon=O(\log_{1+\epsilon}U),$$

and for the case of additive approximation $$U'=U/\Delta.$$

Each reduction is effectively reversible, yielding an equivalence between each approximate problem and the exact problem with a smaller universe. The equivalence holds generally for any numeric data type whose semantics depend only on the ordering of the elements. The equivalence has an alternate interpretation: each approximate problem is equivalent to the exact problem on a machine with larger words. Thus, it precludes faster approximate variants that do not take advantage of fast operations on words.

For universe sizes bigger than the number of bits in a word, the recursive divide-and-conquer approach from the original VEB data structure is applied. Each operation on a universe of size U' reduces to a single operation on a universe of size $\sqrt{U'}$ plus a few constant time operations. When the universe size is b, only a small constant number of arithmetic and bitwise operations are required.

This gives a running time of $O(\log\log_b U')$, where U' is the effective universe size after applying the universe reduction from the approximate to the exact problem.

The model of computation assumed is a modernized version of the random access machine (RAM). The RAM model is a realistic variant of the logarithmic-cost RAM: the model assumes constant-time exact binary integer arithmetic (+, −, ×, div), bitwise operations (lshift, rshift, bitwise-xor, bitwise- and), and addressing operations on words of size b. Put another way, the word size of the RAM is b. Assume that numbers are of the form $i+j/2^b$, where i and j are integers with $0 \leq i,j < 2^b$, and that the numbers are represented with two words, the first holding i and the second holding j. For simplicity of exposition, the "most-significant-bit" function $MSB(x)=\lfloor \log_2 x \rfloor$ is used; it can be implemented in small constant time via the previously mentioned operations and has lower circuit complexity than, e.g., division.

The details of the approximate VEB data structure are as follows: First the relevant semantics and notations are given first. The operation supported are:

N←INSERT(x,d),
DELETE(N),
N←SEARCH(x),
N←MINIMUM(),
N←MAXIMUM(),
N←(PREDECESSOR(N),
N←SUCCESSOR(N),
d←DATA(n), and
x←ELEMENT(N).

The INSERT operation and the query operations return the name N of the element in question. The name is just a pointer into the data structure allowing constant-time access to the element. Subsequent operations on the element are passed this pointer so they can access the element in constant time. INSERT takes an additional parameter d, an arbitrary auxiliary data item SEARCH(x), where x is a real number (but not necessarily an element), returns the name of the largest element less than or equal to x. For the approximate variants, the query operations are approximate in that the element returned by the query is within a $(1+\epsilon)$ relative factor or a $\Delta$ absolute amount of the correct value. Operations ELEMENT(N) and DATA(N), given an element's name N, return the element and its data item, respectively.

The universe (specified by U) and, for the approximate variants, the error of approximation ($\epsilon$ or $\Delta$) are specified when the data structure is instantiated.

The lemma below assumes a logarithmic word-size RAM. The notion of equivalence between data structures is that, given one of the data structures, the other can be simulated with constant-time overhead per operation.

LEMMA. The problem of representing a multiplicatively $(1+\epsilon)$-approximate VEB on universe $[1,U]$ is equivalent to the problem of representing an exact VEB on universe $\{0,1,\ldots,O(\log_{1+\epsilon}U)\}$.

The problem of representing an additively $\Delta$-approximate VEB on universe $[0,U]$ is equivalent to the problem of representing an exact VEB on universe $\{0,1,\ldots,U/\Delta\}$.

Proof. Assume a data structure for the exact data type on the specified universe. To simulate the multiplicatively approximate data structure, the natural mapping to apply to the elements (as discussed herein) is $x \to \lfloor \log_{1+\epsilon} x \rfloor$. Instead, map x to approximately $$\frac{1}{\ln 2}(\log_{1+\epsilon}x) \approx (\log_2 x)/\epsilon$$

and use a mapping that is faster to compute: Let $$k = \left\lceil \log_2 \frac{1}{\epsilon} \right\rceil,$$

let $x=i+j/2^b$, and let $l=MSB(i)$. We use the mapping $f$ that maps x to
  l left-shift(k)
  bitwise-or(i right-shift(l−k))
  bitwise-xor(l left-shift k)
  bitwise-or(j right-shift(b+l−k))
If l<k, then to right-shift by (l−k) means to left-shift by (k−l). Note that in this case the fractional part of x is shifted in.

This mapping effectively maps x to the lexicographically ordered pair <MSB(x),y>, where y represents the bits with indices (l−1) though (l−k) in x. The second through (k+1)st most significant bits of x. The first part of the tuple distinguishes between any two x values that differ in their most significant bit. If two x values have MSB(x)=l, then it suffices to distinguish them if they differ additively by $2^{l-k}$. The second part of the tuple suffices for this.

Note that $f(1)=0$ and $f(U)<2^{k+1}\log_2 U=O(\log_{1+\epsilon}U)$. This shows one direction of the first part. The other direction of the first part is easily shown by essentially inverting the above mapping, so that distinct elements map to elements that differ by at least a factor of $1+\epsilon$. Finally, the second part follows by taking the mapping $(x \to x\,\mathrm{div}\,\Delta)$ and its inverse.

The Lemma reduces the approximate problems to the exact problem with smaller universe size. Below an appropriate solution to the exact problem is given. If an approximate variant is to be implemented, assume the elements have already been mapped by the constant-time function $f$ in the Lemma. The model of computation is a RAM with b-bit words.

A dictionary data structure supports update operations SET(key, value) and UNSET(key) and query operation LOOK-UP(key) (returning the value, if any, associated with the key). It is well known how to implement a dictionary by hashing in space proportional to the number of elements in the dictionary or in an array of size proportional to the key space. In either case, all dictionary operations require only constant time. In the former case, the time is constant with high probability; in the latter case, a well-known trick is required to instantiate the dictionary in constant time.

Each instance of the data structure will have a doubly-linked list of element/datum pairs. The list is ordered by the ordering induced by the elements. The name of each element is a pointer to its record in this list.

If the set to be stored is a multiset, as will generally be the case in simulating an approximate variant, then the elements will be replaced by buckets, which are doubly-linked lists holding the multiple occurrences of an element. Each occurrence holds a pointer to its bucket. In this case the name of each element is a pointer to its record within its bucket.

Each instance will also have a dictionary mapping each element in the set to its name. If the set is a multiset, it will map each element to its bucket. In general, the universe, determined when the data structure is instantiated, is of the form $\{L, \ldots, U\}$. Each instance records the appropriate L and U values and subtracts L from each element, so that the effective universe is $\{0, \ldots, U-L\}$.

The ordered list and the dictionary suffice to support constant-time PREDECESSOR, SUCCESSOR, MINIMUM, and MAXIMUM operations. The other operations use the list and dictionary as follows. INSERT(i) finds the predecessor-to-be of i by calling SEARCH(i), inserts i into the list after the predecessor, and updates the dictionary. If S is a multiset, i is inserted instead into its bucket and the dictionary is updated only if the bucket didn't previously exist. DELETE(N) deletes the element from the list (or from its bucket) and updates the dictionary appropriately.

How SEARCH works depends on the size of the universe. The remainder of this section describes SEARCH queries and how INSERT and DELETE maintain the additional structure needed to support SEARCH queries.

For a universe of size b, the additional structure required is a single b-bit word w. The word represents a bit vector; the ith bit is 1 if the dictionary contains an element i. INSERT sets this bit; DELETE unsets it if no occurrences of i remain in the set. Setting or unsetting bits can be done with a few constant time operations.

The SEARCH(i) operation is implemented as follows. If the list is empty or i is less than the minimum element, return nil. Otherwise, let $$j \leftarrow \text{MSB}(w \text{ bitwise-and}((1\text{left-shift } i)-1)),$$

i.e., let j be the index of the most significant 1-bit in w that is at most as significant as the ith bit. Return j's name from the dictionary.

On universes of size b, all operations require only a few constant-time operations. If hashing is used to implement the dictionary, the total space (number of words) required at any time is proportional to the number of elements currently in the set.

The fully recursive data structure is a straightforward modification of the original van Emde Boas data structure. For those not familiar with the original data structure, an intermediate data structure that is conceptually simpler as a stepping stone is first given. The additional data structures to support SEARCH(i) for a universe $\{0, 1, \ldots, b^{j-1}\}$ are as follows.

Divide the problem into b+1 subproblems: if the current set of elements is S, let $S_k$ denote the set $\{k:S_k \text{ not empty}\}$. Inductively maintain a VEB data structure for each non-empty set $S_k$. Note that the universe size for each $S_k$ is $b^{j-1}$. Each $S_k$ can be a multiset only if S is.

Let T denote the set $\{k:S_k \text{ not } \emptyset\}$. Inductively maintain a VEB data structure for the set T. The datum for each element k is the data structure for $S_k$. Note that the universe size for T is b. Note also that T need not support multi-elements.

Implement SEARCH(i) as follows. If i is in the dictionary, return i's name. Otherwise, determine k such that i would be in $S_k$ if i were in S. Recursively search in T for the largest element k' less than or equal to k. If k'<k or i is less than the minimum element of $S_k$, return the maximum element of $S_{k'}$. Otherwise, recursively search for the largest element less than or equal to i in $S_k$ and return it.

INSERT and DELETE maintain the additional data structures as follows. INSERT(i) inserts i recursively into the appropriate $S_k$. If $S_k$ was previously empty, it creates the data structure for $S_k$ and recursively inserts k into T. DELETE(N) recursively deletes the element from the appropriate $S_k$. If $S_k$ becomes empty, it deletes k from T.

Because the universe of the set T is of size b, all operations maintaining T take constant time. Thus, each SEARCH, INSERT, and DELETE for a set with universe of size $U=b^j$ requires a few constant-time operations and possibly one recursive call on a universe of size $b^{j-1}$. Thus, each such operation requires $O(j)=O(\log_b U)$ time.

To analyze the space requirement, note that the size of the data structure depends only on the elements in the current set. Assuming hashing is used to implement the dictionaries, the space required is proportional to the number of elements in the current set plus the space that would have been required if the distinct elements of the current set had simply been inserted into the data structure. The latter space would be at worst proportional to the time taken for the insertions. Thus, the total space required is proportional to the number of elements plus $O(\log_b U)$ times the number of distinct elements.

The above time is exponentially decreased by balancing the subdivision of the problem exactly as is done in the original van Emde Boas data structure.

The first modification is to balance the universe sizes of the set T and the sets $S_k$. Assume the universe size is $b^{2^j}$. Note that $b^{2^j}=b^{2^{j-1}} \times b^{2^{j-1}}$. Define $S_k=\{i \in S: i \text{ div } b^{2^{j-1}}=k\}$ and define $T=\{k:S_k \text{ is not } \emptyset\}$. Note that the universe size of each $S_k$ and of T is $b^{2^{j-1}}$.

With this modification, SEARCH, INSERT, and DELETE are still well defined. Inspection of SEARCH shows that if SEARCH finds k in T, it does so in constant time, and otherwise it does not search recursively in $S_k$. Thus, only one non-constant-time recursion is required, into a universe of size $b^{2^{j-1}}$. Thus, SEARCH requires $O(j)$ time.

INSERT and DELETE, however, do not quite have this nice property. In the event that $S_k$ was previously empty, INSERT descends recursively into both $S_k$ and T. Similarly, when $S_k$ becomes empty, DELETE descends recursively into both $S_k$ and T.

The following modification to the data structure fixes this problem, just as in the original van Emde Boas data structure. Note that INSERT only updates T when an element is inserted into an empty $S_k$. Similarly, DELETE only updates T when the last element is deleted from the set $S_k$. Modify the data structure (and all recursive data structures) so that the recursive data structures exist only when $|S| \geq 2$. When $|S|=1$, the single element is simply held in the list. Thus, insertion into an empty set and deletion from a set of one element require only constant time. This insures that if INSERT or DELETE spends more than constant time in T, it will require only constant time in $S_k$.

This modification requires that when S has one element and a new element is inserted, INSERT instantiates the recursive data structures and inserts both elements appropriately. The first element inserted will bring both T and some $S_k$ to size one; this requires constant time. If the second element is inserted into the same set $S_k$ as the first element, T is unchanged. Otherwise, the insertion into its newly created set $S_{k'}$ requires only constant time. In either case, only one non-constant-time recursion is required.

Similarly, when S has two elements and one of them is deleted, after the appropriate recursive deletions, DELETE destroys the recursive data structures and leaves the data structure holding just the single remaining element. If the two elements were in the same set $S_k$, then T was already of size one, so only the deletion from $S_k$ requires more than constant time. Otherwise, each set $S_k$ and $S_{k'}$ was already of size one, so only the deletion of the second element from T took more than constant time.

With the two modifications, each SEARCH, INSERT, and DELETE for a universe of size $U=b^{2^j}$ requires at most one non-constant-time recursive call, on a set with universe size $b^{2^{k-1}}$. Thus, the time required for each operation is $O(j)=O(\log \log_b U)$. As for the intermediate data structure, the total space is at worst proportional to the number of elements, plus the time per operation (now $O(\log \log_b U)$) times the number of distinct elements.

Next, three prototypical applications are considered: minimum spanning trees, single-source shortest paths, and semi-dynamic on-line convex hulls. The approximate minimum spanning tree algorithm runs in linear time and is arguably simpler and more practical than the two known linear-time MST algorithms. The approximate single-source shortest paths algorithm is faster than any known algorithm on sparse graphs. The on-line convex hull algorithm is also the fastest known in its class; previously known techniques require preprocessing and thus are not suitable for on-line or dynamic problems. The first two applications are obtained by substituting our data structures into standard, well-known algorithms. The third is obtained by a straightforward adaptation of an existing algorithm to the on-line case. These examples are considered mainly as prototypical applications. In general, approximate data structures can be used in place of any exact counterpart.

The results below assume a RAM with a logarithmic word size as our model of computation.

For the minimum spanning tree problem, the following result about the performance of Prim's algorithm (see R. C. Prim, "Shortest Path Connection Networks and Some Generalizations," *Bell Sys. Tech. J.*, 36:1389–1401, 1957) when our approximate VEB data structure is used to implement the priority queue is shown:

THEOREM 1. Given a graph with edge weights in $\{0, \ldots, U\}$, Prim's algorithm, when implemented with the approximate VEB with multiplicative error $(1+\epsilon)$, finds a $(1+\epsilon)$-approximate minimum spanning tree in an n-node, m-edge graph in $$O\left((n+m)\log\left(1+\left(\log\frac{1}{\varepsilon}\right)\middle/\log \log nU\right)\right)$$

time.

For $1/\epsilon \leq \text{polylog}(nU)$, Theorem 1 gives a linear-time algorithm. This algorithm is arguably simpler and more practical than the two known linear-time MST algorithms. This application is a prototypical example for which the use of an approximate data structure is equivalent to slightly perturbing the input. Approximate data structures can be "plugged in" to such algorithms without modifying the algorithm.

For the single-source shortest paths problem, the following result is obtained by using an approximate VEB data structure as a priority queue in Dijkstra's algorithm (see, R. E. Tarjan, "Data Structures and Network Algorithms," SIAM, Philadelphia, 1983):

THEOREM 2. Given a graph with edge weights in $\{0, \ldots, U\}$ and any $0<\epsilon \leq 2$, Dijkstra's algorithm, when implemented with the approximate VEB with multiplicative error $(1+\epsilon/(2n))$, computes single-source shortest path distances within a factor of $$(1+\varepsilon) \text{ in } O\left((n+m)\log\left(\log\frac{n}{\varepsilon}\middle/\log \log U\right)\right)$$

time.

If $\log(1/\epsilon) \leq \text{polylog}(n) \log \log U$, the algorithm runs in $O((n+m) \log \log n)$ time—faster than any known algorithm on sparse graphs—and is simpler than theoretically competitive algorithms. This is a prototypical example of an algorithm for which the error increases by the multiplicative factor at each step. If such an algorithm runs in polynomial time, then $O(\log \log n)$ time per VEB operation can be obtained with insignificant net error. Again, this speed-up can be obtained with no adaptation of the original algorithm.

The proof of Theorem 2 follows the proof of the exact shortest paths algorithm. The crux of the proof is an inductive claim, saying that any vertex w that becomes labeled during or after the scanning of a vertex v also satisfies $dist(w) \geq dist(v)$, where $dist(w)$ is a so-called tentative distance from the source to w. When using a $(1+\epsilon)$-approximate VEB data structure to implement the priority queue, the inductive claim is replaced by $$dist(w) \geq dist(v)/(1+\epsilon/(2n))^i$$

where vertex v is the ith vertex to be scanned. Thus, the accumulated multiplicative error is bounded by $$(1+\epsilon/(2n))^n \leq e^{\epsilon/2} \leq (1+\epsilon).$$

Finally, the semi-dynamic on-line convex hull problem is considered. In this problem, a set of planar points is processed in sequence. After each point is processed, the convex hull of the points given so far must be computed. Queries of the form "is x in the current hull?" can also be given at any time. For the approximate version, the hull computed and the answers given must be consistent with a $(1+\Delta)$-approximate hull, which is contained within the true convex hull such that the distance of any point on the true hull to the approximate hull is $O(\Delta)$ times the diameter.

The following result about the Graham scan algorithm (see, R. L. Graham, "An Efficient Algorithm for Determining the Convex Hull of a Finite Planar Set") is shown when run using our approximate VEB data structure:

THEOREM 3. The on-line $(1+\Delta)$-approximate convex hull can be computed by a Graham scan in constant amortized time per update if $\Delta \geq \log^{-c} n$ for any fixed $c>0$ and in $O(\log \log n)$ amortized time per update if $\Delta \geq n^{-c}$.

This represents the first constant-amortized-time-per-query approximation algorithm for the on-line problem. This example demonstrates the usefulness of approximate data structures for dynamic/on-line problems. Related approximate sorting techniques require preprocessing, which precludes their use for on-line problems.

Graham's scan algorithm is based on scanning the points according to an order determined by their polar representation, relative to a point that is in the convex hull, and maintaining the convex hull via local corrections. Graham's scan is adapted to obtain the on-line algorithm, as sketched below. As an invariant, there is a set of points that are in the intermediate convex hull, stored in an approximate VEB according to their angular coordinates. The universe is $[0, 2\pi]$ with a $\Delta$ additive error, which can be interpreted as the perturbation error of points in their angular coordinate, without changing their values in the distance coordinates. This results in point displacements of at most $(1+\Delta)$ times the diameter of the convex hull.

Given a new point, its successor and predecessor in the VEB are found, and the operations required to check the convex hull and, if necessary, to correct it are carried on, as in Graham's algorithm. These operations may include the insertion of the new point into the VEB (if the point is on the convex hull) and the possible deletion of other points. Since each point can only be deleted once from the convex hull, the amortized number of VEB operations per point is constant.

The above detailed description has illustrated a method of defining approximate data structures. The method has not been limited to specific hardware or software. Instead, the method has been described in a such a manner that those skilled in the art can readily adapt such hardware or software as may be available or preferable.

I claim:

1. A computer implemented method of processing operations on a data structure stored in a computer memory given that a certain error may be tolerated in the execution of the operations on the data structure, said computer implemented method comprising the steps of:

(a) assigning, implemented by the computer, a representative to an item or a group of items in the data structure stored in the computer memory, the items or the group of items including at least one of an operation, an instruction and a transaction request to be executed by the computer, the representative representing the item or a subset of the group of items, and the representative comprising an approximation of the data structure; and (b) executing at least one of the operations implemented by the computer, on the data structure by manipulating the representative producing an approximate result corresponding to the approximation of the data structure.

2. A computer implemented method according to claim 1, wherein the group comprises a plurality of groups, and wherein said assigning step (a) further comprises the step of assigning a different representative to each of the plurality of groups of items in the data structure, and each different representative representing an approximation of a corresponding group of the plurality of groups.

3. A computer implemented method according to claim 1, wherein said executing step (b) executes the transaction request on the data structure to produce the approximate result, and wherein said computer implemented process processes the transaction request faster using the representative of the group than when using all of the group of items.

4. A computer implemented method according to claim 1, wherein the representative represents an approximation of the group of items.

5. A computer implemented method according to claim 1, wherein the transaction requested executed by the computer changes a representation of the representative to a different data item producing the approximate result.

6. A computer implemented method of processing transaction requests on a data structure stored in a computer memory given that a certain error may be tolerated in the execution of the transaction requests on the data structure, said computer implemented method comprising the steps of:

(a) assigning, implemented by the computer, a representative to an item or a group of items in the data structure stored in the computer memory, the data structure being a collection of data items, predefined relationships between the data items, and transactions that are applied to or operate on at least a set of the data items having the predefined relationships, and the representative representing the item or a subset of the group of items, the data structure comprising at least one of a priority queue, a linked list, an ordered priority queue, a van Emde Boas (VEB), a dictionary and a list; and (b) executing, implemented by the computer, a transaction request on the set of the data items in the data structure by manipulating the representative producing an approximate result, the approximate result including the certain error that will be tolerated when the transaction requests are executed by the computer on the data structure.

7. A computer implemented method according to claim 6, wherein the group comprises a plurality of groups, and wherein said assigning step (a) further comprises the step of assigning a different representative to each of the plurality of groups of items in the data structure, and each of the different representative representing an approximation of a corresponding group of the plurality of groups.

8. A computer implemented method according to claim 6, wherein said executing step (b) executes the transaction request on the data structure to produce the approximate result, and wherein said computer implemented process processes the transaction request faster using the representative of the group than when using all of the group of items.

9. A computer implemented method according to claim 6, wherein the representative represents an approximation of the group of items.

10. A computer implemented method according to claim 6, wherein the transaction requested executed by the computer changes a representation of the representative to a different data item producing the approximate result.

11. A computer implemented method according to claim 6, wherein the transactions comprise at least one of an insert, a delete, a search, a minimum, a maximum, a predecessor, a successor, a set, an unset, and a look-up.

12. A memory storing data for access by a computer implemented process executed on a data processing system, the computer implemented process processing transaction requests on a data structure stored in the memory given that a certain error may be tolerated in the execution of the transaction requests on the data structure, said memory comprising:

a data structure stored in said memory, the data structure being a collection of data items, predefined relationships between the data items, and transactions that are applied to or operate on at least a set of the data items having the predefined relationships, the transactions comprise at least one of an insert, a delete, a search, a minimum, a maximum, a predecessor, a successor, a set, an unset, and a look-up, said data structure including information including:

a group of items of data; and a representative assigned to an item or the group of items in the data structure stored in the memory, the representative representing the item or a data subset of the group of items, wherein when said computer implemented process accesses said memory to execute a transaction request on the set of the data items in said data structure, said computer implemented process executes the transaction request on the representative producing an approximate result, the approximate result including the certain error that will be tolerated when the transaction requests are executed by the computer on the data structure.

13. A computer implemented method according to claim 12, wherein the data structure comprising at least one of a priority queue, a linked list, an ordered priority queue, a van Emde Boas (VEB), a dictionary, and a list.

14. A computer implemented method of processing transaction requests on at least one data structure stored in a computer memory given that a certain error may be tolerated in the execution of at least one of the transaction requests on the at least one data structure, said computer implemented method comprising the steps of:

(a) assigning, implemented by the computer, at least one representative to an item or a group of items in the data structure stored in the computer memory, the items or the group of items including at least one of an operation, an instruction and a transaction request to be executed by the computer, the representative representing the at least one item or a subset of the at least one group of items, and the representative comprising an approximation of the data structure; and (b) executing, implemented by the computer, the at least one of the transaction requests on the at least one data structure by manipulating the at least one representative producing at least one approximate result corresponding to the approximation of the data structure.

15. A memory storing data for access by a computer implemented process executed on a data processing system, the computer implemented process processing transaction requests on a data structure stored in the memory given that a certain error may be tolerated in the execution of the transaction requests on the data structure, said memory comprising:

a data structure stored in said memory, said data structure including information including:

a group of items of data; and a representative assigned to an item or the group of items in the data structure stored in the computer memory, the items or the group of items including at least one of an operation, an instruction and a transaction request to be executed by the computer, the representative representing the item or a subset of the group of items, and the representative comprising an approximation of the data structure;

wherein when said computer implemented process accesses said memory to execute a transaction request on said data structure, said computer implemented process executes the transaction request on the representative producing an approximate result corresponding to the approximation of the data structure.

16. A computer implemented method of processing transaction requests on a data structure stored in a computer memory given that at least one error may be tolerated in the execution of the transaction requests on the data structure, said computer implemented method comprising the steps of:

(a) assigning, implemented by the computer, a representative to an item or a group of items in the data structure stored in the computer memory, the data structure being a collection of data items including at least one of an operation, an instruction and a transaction request to be executed by the computer, predefined relationships between the data items, and transactions that are applied to or operate on at least a set of the data items having the predefined relationships, and the representative representing the item or a subset of the group of items, and the representative comprising an approximation of the data structure; and (b) executing, implemented by the computer, a transaction request on the set of the data items in the data structure by manipulating the representative producing an approximate result, the approximate result including the at least one error that will be tolerated when the transaction requests are executed by the computer on the data structure and corresponding to the approximation of the data structure.

\* \* \* \* \*